(12) United States Patent
Hood et al.

(10) Patent No.: US 7,676,281 B2
(45) Date of Patent: Mar. 9, 2010

(54) DISTRIBUTED DATABASE IN AN INDUSTRIAL AUTOMATION ENVIRONMENT

(75) Inventors: Gavan W. Hood, Upper Lockyer (AU); Ralph Kappelhoff, Milwaukee, WI (US); Kenwood H. Hall, Hudson, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1001 days.

(21) Appl. No.: 11/238,537

(22) Filed: Sep. 29, 2005

(65) Prior Publication Data

US 2006/0259160 A1   Nov. 16, 2006

Related U.S. Application Data

(60) Provisional application No. 60/680,682, filed on May 13, 2005.

(51) Int. Cl.
*G05B 11/01* (2006.01)
(52) U.S. Cl. .................................................. 700/20
(58) Field of Classification Search ............... 700/2, 700/4, 19, 20
See application file for complete search history.

(56) References Cited

U.S. PATENT DOCUMENTS

| | | | |
|---|---|---|---|
| 4,268,901 A | 5/1981 | Subrizi et al. | |
| 4,347,564 A | 8/1982 | Sugano et al. | |
| 4,623,964 A | 11/1986 | Getz et al. | |
| 4,990,838 A | 2/1991 | Kawato et al. | |
| 5,072,374 A | 12/1991 | Sexton et al. | |
| 5,185,708 A | 2/1993 | Hall et al. | |
| 5,253,184 A | 10/1993 | Kleinschnitz | |
| 5,282,244 A * | 1/1994 | Fuller et al. ............ 379/230 |
| 5,301,320 A | 4/1994 | McAtee et al. | |
| 5,446,868 A | 8/1995 | Gardea et al. | |
| 5,455,775 A | 10/1995 | Huber et al. | |
| 5,485,620 A | 1/1996 | Sadre et al. | |
| 5,504,891 A | 4/1996 | Motoyama et al. | |
| 5,537,585 A | 7/1996 | Blickenstaff et al. | |
| 5,572,731 A | 11/1996 | Morel et al. | |
| 5,611,059 A | 3/1997 | Benton et al. | |
| 5,619,724 A | 4/1997 | Moore | |
| 5,634,048 A | 5/1997 | Ryu et al. | |
| 5,644,740 A | 7/1997 | Kiuchi | |
| 5,675,748 A | 10/1997 | Ross | |

(Continued)

OTHER PUBLICATIONS

Ozsoyoglu et al.; "Database Systems for Programmable Logic Controllers"; 1990; vol. 420; pp. 183-199.*

(Continued)

*Primary Examiner*—Albert DeCady
*Assistant Examiner*—Chad Rapp
(74) *Attorney, Agent, or Firm*—Turocy & Watson LLP; William R. Walbrun

(57) ABSTRACT

A distributed database system within an industrial automation environment comprises a plurality of associated programmable logic controllers, wherein each of the programmable logic controllers includes data relating to one of a process and a device. Furthermore, the data within the plurality of programmable logic controllers can conform to a hierarchically structured data model, which, for example, can be based upon ISA S95, ISA S88, OMAC, or any suitable combination thereof. A reception component receives and services a request for data that is located within at least one of the programmable logic controllers.

29 Claims, 12 Drawing Sheets

U.S. PATENT DOCUMENTS

| | | |
|---|---|---|
| 5,715,413 A | 2/1998 | Ishai et al. |
| 5,721,905 A | 2/1998 | Elixmann et al. |
| 5,761,499 A | 6/1998 | Sondregger |
| 5,790,935 A | 8/1998 | Payton |
| 5,797,137 A | 8/1998 | Golshani et al. |
| 5,812,773 A | 9/1998 | Norin |
| 5,828,851 A | 10/1998 | Nixon et al. |
| 5,832,486 A | 11/1998 | Itoh et al. |
| 5,838,563 A | 11/1998 | Dove et al. |
| 5,848,273 A | 12/1998 | Fontana et al. |
| 5,862,052 A | 1/1999 | Nixon et al. |
| 5,884,025 A | 3/1999 | Baehr et al. |
| 5,884,033 A | 3/1999 | Duvall et al. |
| 5,913,029 A | 6/1999 | Shostak |
| 5,924,094 A | 7/1999 | Sutter |
| 5,936,539 A | 8/1999 | Fuchs |
| 5,940,294 A | 8/1999 | Dove |
| 5,940,854 A | 8/1999 | Green, Jr. et al. |
| 5,951,440 A | 9/1999 | Reichlinger |
| 5,960,420 A | 9/1999 | Leymann et al. |
| 5,966,705 A | 10/1999 | Koneru |
| 5,970,494 A * | 10/1999 | Velissaropoulos et al. ... 707/102 |
| 5,978,577 A | 11/1999 | Rierden et al. |
| 5,980,078 A | 11/1999 | Krivoshein et al. |
| 5,983,016 A | 11/1999 | Brodsky et al. |
| 6,011,899 A | 1/2000 | Ohishi et al. |
| 6,032,208 A | 2/2000 | Nixon et al. |
| 6,044,217 A | 3/2000 | Brealey et al. |
| 6,061,740 A | 5/2000 | Ferguson et al. |
| 6,063,129 A | 5/2000 | Dadd et al. |
| 6,081,899 A | 6/2000 | Byrd |
| 6,098,116 A | 8/2000 | Nixon et al. |
| 6,101,531 A | 8/2000 | Eggleston et al. |
| 6,195,591 B1 | 2/2001 | Nixon et al. |
| 6,208,987 B1 | 3/2001 | Nihei |
| 6,234,899 B1 | 5/2001 | Nulph |
| 6,266,726 B1 | 7/2001 | Nixon et al. |
| 6,275,977 B1 | 8/2001 | Nagai et al. |
| 6,308,168 B1 | 10/2001 | Dovich et al. |
| 6,308,224 B1 | 10/2001 | Leymann et al. |
| 6,311,187 B1 | 10/2001 | Jeyaraman |
| 6,327,511 B1 | 12/2001 | Naismith et al. |
| 6,336,152 B1 | 1/2002 | Richman et al. |
| 6,356,920 B1 | 3/2002 | Vandersluis |
| 6,377,957 B1 | 4/2002 | Jeyaraman |
| 6,393,566 B1 | 5/2002 | Levine |
| 6,398,106 B1 | 6/2002 | Ulvr et al. |
| 6,409,082 B1 | 6/2002 | Davis et al. |
| 6,411,987 B1 | 6/2002 | Steger et al. |
| 6,415,983 B1 | 7/2002 | Ulvr et al. |
| 6,425,051 B1 | 7/2002 | Burton et al. |
| 6,438,744 B2 | 8/2002 | Toutonghi et al. |
| 6,445,963 B1 | 9/2002 | Blevins et al. |
| 6,446,202 B1 | 9/2002 | Krivoshein et al. |
| 6,457,053 B1 | 9/2002 | Satagopan et al. |
| 6,469,986 B1 | 10/2002 | Lecheler et al. |
| 6,473,656 B1 | 10/2002 | Langels et al. |
| 6,477,435 B1 | 11/2002 | Ryan et al. |
| 6,484,061 B2 | 11/2002 | Papadopoulos et al. |
| 6,501,996 B1 | 12/2002 | Bieber |
| 6,505,247 B1 | 1/2003 | Steger et al. |
| 6,510,352 B1 | 1/2003 | Badavas et al. |
| 6,539,271 B2 | 3/2003 | Lech et al. |
| 6,539,430 B1 | 3/2003 | Humes |
| 6,539,458 B2 | 3/2003 | Holmberg |
| 6,615,091 B1 * | 9/2003 | Birchenough et al. ......... 700/96 |
| 6,631,519 B1 | 10/2003 | Nicholson et al. |
| 6,643,555 B1 | 11/2003 | Eller et al. |
| 6,661,426 B1 | 12/2003 | Jetha et al. |
| 6,664,981 B2 | 12/2003 | Ashe et al. |
| 6,681,227 B1 | 1/2004 | Kojima et al. |
| 6,687,817 B1 | 2/2004 | Paul |
| 6,697,797 B1 | 2/2004 | Hoggatt et al. |
| 6,704,746 B2 | 3/2004 | Sokolov et al. |
| 6,714,949 B1 | 3/2004 | Frey, Jr. |
| 6,714,981 B1 | 3/2004 | Skaggs |
| 6,738,821 B1 | 5/2004 | Wilson et al. |
| 6,745,089 B2 | 6/2004 | Rasmussen et al. |
| 6,748,486 B2 | 6/2004 | Burton et al. |
| 6,751,634 B1 | 6/2004 | Judd |
| 6,758,403 B1 | 7/2004 | Keys et al. |
| 6,760,721 B1 | 7/2004 | Chasen et al. |
| 6,760,732 B2 | 7/2004 | Busshart et al. |
| 6,763,395 B1 | 7/2004 | Austin |
| 6,766,312 B2 | 7/2004 | Landt |
| 6,768,987 B1 | 7/2004 | Couch et al. |
| 6,769,095 B1 | 7/2004 | Brassard et al. |
| 6,778,537 B1 | 8/2004 | Ishibashi |
| 6,801,822 B1 | 10/2004 | Fujiwara et al. |
| 6,807,632 B1 | 10/2004 | Carpentier et al. |
| 6,809,732 B2 | 10/2004 | Zatz et al. |
| 6,832,120 B1 * | 12/2004 | Frank et al. .................. 700/65 |
| 6,836,892 B2 | 12/2004 | Ikoma et al. |
| 6,839,790 B2 | 1/2005 | Barros De Almeida et al. |
| 6,842,769 B1 | 1/2005 | Kim et al. |
| 6,853,920 B2 | 2/2005 | Hsiung et al. |
| 6,865,509 B1 | 3/2005 | Hsiung et al. |
| 6,868,413 B1 | 3/2005 | Grindrod et al. |
| 6,874,145 B1 | 3/2005 | Ye et al. |
| 6,874,146 B1 | 3/2005 | Iyengar |
| 6,880,060 B2 | 4/2005 | Talagala et al. |
| 6,889,282 B2 | 5/2005 | Schollenberger |
| 6,901,578 B1 | 5/2005 | Beaven et al. |
| 6,904,473 B1 | 6/2005 | Bloxham et al. |
| 6,920,474 B2 | 7/2005 | Walsh et al. |
| 6,928,521 B1 | 8/2005 | Burton et al. |
| 6,930,985 B1 | 8/2005 | Rathi et al. |
| 6,934,749 B1 | 8/2005 | Black et al. |
| 6,938,079 B1 | 8/2005 | Anderson et al. |
| 6,944,626 B2 | 9/2005 | Cameron et al. |
| 6,947,947 B2 | 9/2005 | Block et al. |
| 6,950,900 B1 | 9/2005 | McKean et al. |
| 6,954,770 B1 | 10/2005 | Carlson et al. |
| 6,961,728 B2 | 11/2005 | Wynblatt et al. |
| 6,973,556 B2 | 12/2005 | Milligan et al. |
| 6,975,913 B2 | 12/2005 | Kreidler et al. |
| 7,146,355 B2 | 12/2006 | Chu-Caroll |
| 7,162,312 B2 | 1/2007 | Gross et al. |
| 7,171,476 B2 | 1/2007 | Maeda et al. |
| 7,225,193 B2 | 5/2007 | Mets et al. |
| 7,251,222 B2 | 7/2007 | Chen et al. |
| 7,308,454 B2 | 12/2007 | Abineri et al. |
| 2002/0007286 A1 | 1/2002 | Okamoto |
| 2002/0012401 A1 | 1/2002 | Karolys et al. |
| 2002/0013748 A1 | 1/2002 | Edmison et al. |
| 2002/0069167 A1 | 6/2002 | Conlow |
| 2002/0073236 A1 | 6/2002 | Helgeson et al. |
| 2002/0087786 A1 | 7/2002 | Burton et al. |
| 2002/0091838 A1 | 7/2002 | Rupp et al. |
| 2002/0103785 A1 | 8/2002 | Harvey |
| 2002/0131404 A1 | 9/2002 | Mehta et al. |
| 2002/0161827 A1 * | 10/2002 | Brault ........................ 709/203 |
| 2002/0188366 A1 | 12/2002 | Pepper et al. |
| 2002/0194577 A1 | 12/2002 | Connor et al. |
| 2003/0014387 A1 | 1/2003 | Kreidler et al. |
| 2003/0036876 A1 | 2/2003 | Fuller et al. |
| 2003/0065673 A1 | 4/2003 | Grobler et al. |
| 2003/0090514 A1 | 5/2003 | Cole et al. |
| 2003/0120710 A1 | 6/2003 | Pulsipher et al. |
| 2003/0123467 A1 | 7/2003 | Du et al. |
| 2003/0126308 A1 | 7/2003 | Kim |
| 2003/0172145 A1 | 9/2003 | Nguyen |
| 2003/0177114 A1 | 9/2003 | Lin et al. |
| 2003/0212828 A1 | 11/2003 | Miyazaki et al. |

| | | |
|---|---|---|
| 2003/0218641 A1 | 11/2003 | Longobardi |
| 2004/0006401 A1 | 1/2004 | Yamada et al. |
| 2004/0024995 A1 | 2/2004 | Swaine |
| 2004/0044421 A1 | 3/2004 | Brune et al. |
| 2004/0073565 A1 | 4/2004 | Kaufman et al. |
| 2004/0098153 A1 | 5/2004 | Neudeck |
| 2004/0098269 A1 | 5/2004 | Wise et al. |
| 2004/0117624 A1 | 6/2004 | Brandt et al. |
| 2004/0153171 A1 | 8/2004 | Brandt et al. |
| 2004/0167790 A1 | 8/2004 | Grasse |
| 2004/0193449 A1 | 9/2004 | Wildman et al. |
| 2004/0196855 A1 | 10/2004 | Davies et al. |
| 2004/0199655 A1 | 10/2004 | Davies et al. |
| 2004/0203620 A1 | 10/2004 | Thome et al. |
| 2004/0210629 A1 | 10/2004 | Klindt et al. |
| 2004/0249771 A1 | 12/2004 | Berg et al. |
| 2004/0260591 A1 | 12/2004 | King |
| 2004/0268186 A1 | 12/2004 | Maturana et al. |
| 2005/0005289 A1 | 1/2005 | Adolph et al. |
| 2005/0015397 A1 | 1/2005 | Abineri et al. |
| 2005/0044112 A1 | 2/2005 | Yamamoto et al. |
| 2005/0065626 A1 | 3/2005 | Kappelhoff et al. |
| 2005/0065829 A1 | 3/2005 | Birkhoelzer |
| 2005/0065971 A1 | 3/2005 | Honda |
| 2005/0069853 A1 | 3/2005 | Tyson et al. |
| 2005/0091349 A1 | 4/2005 | Scheibli |
| 2005/0102672 A1 | 5/2005 | Brothers |
| 2005/0107897 A1 | 5/2005 | Callaghan |
| 2005/0108247 A1 | 5/2005 | Heinla et al. |
| 2005/0120021 A1 | 6/2005 | Tang et al. |
| 2005/0129247 A1 | 6/2005 | Gammel et al. |
| 2005/0135782 A1 | 6/2005 | Ando et al. |
| 2005/0154741 A1 | 7/2005 | Hebert et al. |
| 2005/0166215 A1 | 7/2005 | Holloway et al. |
| 2005/0177687 A1 | 8/2005 | Rao |
| 2005/0187925 A1 | 8/2005 | Schechinger et al. |
| 2005/0193118 A1 | 9/2005 | Le et al. |
| 2005/0198248 A1 | 9/2005 | Morimoto et al. |
| 2005/0216460 A1 | 9/2005 | Yoon et al. |
| 2005/0223010 A1 | 10/2005 | Murray |
| 2005/0251527 A1 | 11/2005 | Phillips et al. |
| 2005/0256788 A1 | 11/2005 | Mukai |
| 2005/0268253 A1 | 12/2005 | Johnson et al. |
| 2005/0278373 A1 | 12/2005 | Corbett et al. |
| 2006/0004475 A1 | 1/2006 | Brackett et al. |
| 2006/0004847 A1 | 1/2006 | Claudatos et al. |
| 2006/0064428 A1 | 3/2006 | Colaco et al. |
| 2006/0173895 A1 | 8/2006 | Engquist et al. |
| 2006/0195817 A1 | 8/2006 | Moon |
| 2006/0212855 A1 | 9/2006 | Bournas et al. |
| 2007/0268922 A1 | 11/2007 | Dougan et al. |

OTHER PUBLICATIONS

Pitzek et al., Configuration and Management of a Real-Time Smart Transducer Network, 2003 IEEE, 2003, 4 pages.
European Search Report dated Jun. 12, 2005 for European Patent Application Serial No. EP05016793, 3 pages.
John Kubiatowicz, et al. "OceanStore: An Architecture for Global-Scale Persistent Storage" ASPLOS 2000, Cambridge, Massachusetts (2000).
Roy Goldman, et al. "From Semistructured Data to XML: Migrating the Lore Data Model and Query Language" (1999).
OA dated Oct. 28, 2008 for U.S. Appl. No. 11/240,335, 15 pages.
ISR mailed Jun. 19, 2008 for PCT Application No. PCT/ US06/ 18350, 2 pages.
OA dated Apr. 15, 2009 for U.S. Appl. No. 11/240,335, 10 pages.
OA dated May 15, 2008 for U.S. Appl. No. 11/240,335, 31 pages.
OA dated Oct. 8, 2008 for U.S. Appl. No. 11/238,607, 32 pages.
ISR mailed Jul. 7, 2008 for PCT Application No. PCT/ US06/ 18180, 2 pages.
OA dated Mar. 6, 2009 for U.S. Appl. No. 11/238,607, 61 pages.
OA dated Apr. 2, 2008 for U.S. Appl. No. 11/238,607, 37 pages.
OA dated May 1, 2009 for U.S. Appl. No. 11/239,567, 35 pages.
OA dated May 30, 2008 for U.S. Appl. No. 11/239,567, 29 pages.
ISR mailed Mar. 4, 2008 for PCT Application No. PCT/ US06/ 18181, 2 pages.
OA dated Nov. 14, 2008 for U.S. Appl. No. 11/239,567, 34 pages.
OA dated Nov. 2, 2007 for U.S. Appl. No. 11/239,567, 23 pages.
OA dated Jun. 3, 2009 for U.S. Appl. No. 11/238,606, 25 pages.
OA dated Jul. 2, 2008 for U.S. Appl. No. 11/238,606, 17 pages.
OA dated Jan. 18, 2008 for U.S. Appl. No. 11/238,606, 8 pages.
OA dated Nov. 20, 2008 for U.S. Appl. No. 11/238,606, 19 pages.
ISR mailed May 6, 2008 for PCT Application No. PCT/ US06/ 18122, 1 page.
ISR mailed Jan. 24, 2008 for PCT Application No. PCT/ US06/ 18238, 1 page.

* cited by examiner

DISTRIBUTED DATABASE IN AN INDUSTRIAL AUTOMATION ENVIRONMENT

CROSS-REFERENCE TO RELATED APPLICATION

This application claims the benefit of U.S. Provisional Patent Application Ser. No. 60/680,682, filed on May 13, 2005 and entitled SCHEMA THAT FACILITATES PLANT REPRESENTATION AND RELATED FUNCTIONALITY, the entirety of which is incorporated herein by reference.

TECHNICAL FIELD

The claimed subject matter relates to industrial control systems and, more particularly, to data storage and retrieval in an industrial automation environment.

BACKGROUND

Due to advances in computing technology, businesses today are able to operate more efficiently when compared to substantially similar businesses only a few years ago. For example, internal networking enables employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, operations that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases or web services referencing databases that are accessible by system/process/project managers on a factory floor. For instance, sensors and associated software can detect a number of instances that a particular machine has completed an operation given a defined amount of time. Further, data from sensors can be delivered to a processing unit related to system alarms. Thus, a factory automation system can review collected data and automatically and/or semi-automatically schedule maintenance of a device, replacement of a device, and other various procedures that relate to automating a process.

While various advancements have been made with respect to automating an industrial process, utilization and design of controllers has been largely unchanged. Industrial controllers are special-purpose computers utilized for controlling industrial processes, manufacturing equipment, and other factory automation processes, such as data collection through networked systems. Controllers often work in concert with other computer systems to form an environment whereby a majority of modern and automated manufacturing operations occur. These operations involve front-end processing of materials such as steel production to more intricate manufacturing processes such as automobile production that involves assembly of previously processed materials. Often such as in the case of automobiles, complex assemblies can be manufactured with high technology robotics assisting the industrial control process.

In many automated processes, including the basic production of commodities such as food, beverages, and pharmaceuticals, complex state logic is often designed and programmed by systems Engineers or provided in some cases by automated equipment manufacturers. This logic is often programmed with common PLC ladder logic or higher level languages supported by Sequential Function Charts or Function Blocks. Sequence logic can be employed for a plurality of tasks such as material movement and conveying operations, packaging operations, or as part of an assembly process itself, wherein various stages of an assembly are sequenced from stage to stage until a final assembly occurs. As can be appreciated, much planning and design is required to implement an automated production process that can involve hundreds of machines, computers, and program logic to facilitate proper operation of the respective sequences.

A common problem associated with control systems is lack of uniformity across system/process boundaries, as well as a lack of uniformity between controller manufacturers, software vendors, and customers. Such non-uniformity can be as simplistic as discrepancies in naming conventions between a software vendor and a customer, or as complex as disparate software representations with respect to portions of an industrial automation framework. Given the above-mentioned discrepancies (as well as a myriad of other discrepancies), a substantial amount of ad-hoc coding is often required to automate a process. Accordingly, significant cost is incurred by a manufacturer to employ computer and programming specialists to generate and maintain ad-hoc programs necessary to automate a manufacturing process. This cost is then passed on to purchasers of the manufactured product.

With more detail regarding conventional controllers, such controllers have been designed to efficiently undertake real-time control. For instance, conventional programmable logic controllers receive data from sensors and, based upon the received data, control an actuator, drive, or the like. These controllers recognize a source and/or destination of the data by way of a symbol and/or address associated with a source and/or destination. More particularly, industrial controllers include communications ports and/or adaptors, and sensors, actuators, drives, and the like are communicatively coupled to such ports/adaptors. Thus, a controller can recognize device identify when data is received and further deliver control data to an appropriate device.

As can be discerned from the above, data associated with conventional industrial controllers is created, delivered, and/or stored with a flat namespace data structure. In other words, all that can be discovered by reviewing data received and/or output by a controller is an identity of an actuator or sensor and a status thereof. This industrial controller architecture operates efficiently for real-time control of a particular device—however, problems can arise when data from industrial controllers is desired for use by a higher-level system. For example, if data from the controller was desired for use by a scheduling application, individual(s) familiar with the controller must determine which data is desirable, sort the data, package the data in a desired format, and thereafter map such data to the scheduling application. This introduces another layer of software, and thus provides opportunities for confusion in an industrial automation environment. The problem is compounded if several applications wish to utilize similar data. In operation, various controllers output data, package it in a flat namespace structure, and provide it to a network. Each application utilizing the data copies such data to internal memory, sorts the data, organizes the data, and packages the data in a desired format. Accordingly, multiple copies of similar data exist in a plurality of locations, where each copy of the data may be organized and packaged disparately.

As can be discerned from the above, locating and interpreting a particular piece of data can be extremely difficult. For instance, the data appears as a collection of ones and zeros, and unless one is knowledgeable of the data standard, determining meaning of such data can be extremely difficult. Furthermore, one must have knowledge of where data is physically stored to locate desired data. For instance, data from a first programmable logic controller can be stored in a first data store while data from a second programmable logic controller can be stored in a second data store, and data cannot be intermingled due to disparate proprietary setup of the programmable logic controllers (e.g., they output data in a disparate manner).

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

A distributed database system for utilization within an industrial automation environment is described herein. The distributed database system enables provision of a unified view of data despite such data residing in disparate locations. Furthermore, a requesting entity need not know an exact location of data within an industrial automation environment to receive such data. In one particular example, the distributed database system can include a plurality of programmable logic controllers that include data storage capabilities. Furthermore, the programmable logic controllers can receive, execute, and generate data objects that conform to a hierarchically structured data model. While the above example indicates that the distributed database system includes several programmable logic controllers, it is understood that such system can further include other devices that can retain data that conforms to the hierarchically structured data model. It is beneficial, however, to maintain data at a point of implementation and/or location, as such data is less likely to be associated with corruption and provides a most reliable depiction of a factory environment. In other words, applications and/or individuals can retrieve and analyze data from within a programmable logic controller with confidence.

A data request can be received with respect to data within the distributed database system, and a directory can be utilized to effectively locate such data. For example, a programmable logic controller can generate data that conforms to the hierarchically structured data model and inform the directory of such creation. In other words, the programmable logic controller (due to the structured data model) can be aware of a system, device, process, and/or sub-process being controlled. Thus, for instance, if the programmable logic controller is controlling a device within a particular line, within a particular workcell, etc., it can be aware that data objects associated with the device lie within a particular location in a plant hierarchy. This knowledge can then be passed to the directory structure as a pointer to the actual data. Therefore, an individual accessing data within the distributed database system can traverse a hierarchical view of data and quickly access desired data from one or more programmable logic controllers.

As data storage remains finite, another aspect described in more detail herein relates to transfer of data between storage entities within the distributed database system. For example, a minimum amount of data storage space that should remain available with respect to one or more programmable logic controllers can be defined. Available storage space associated with the programmable logic controllers can then be monitored to ensure that the available storage does not fall below the pre-defined threshold. If it is determined that the available data storage space with respect to a programmable logic controller has fallen below the threshold, data can be transferred from such programmable logic controller to a disparate storage device. For instance, data can be transferred from the programmable logic controller to a disparate programmable logic controller or to an archiving system. Furthermore, the directory can be automatically updated upon transfer of the data.

To the accomplishment of the foregoing and related ends, certain illustrative aspects are described herein in connection with the following description and the annexed drawings. These aspects are indicative, however, of but a few of the various ways in which the principles of the claimed subject matter can be employed, and such matter is intended to include all such aspects and their equivalents. Other advantages and novel features will become apparent from the following detailed description when considered in conjunction with the drawings.

DETAILED DESCRIPTION

Figure 1:
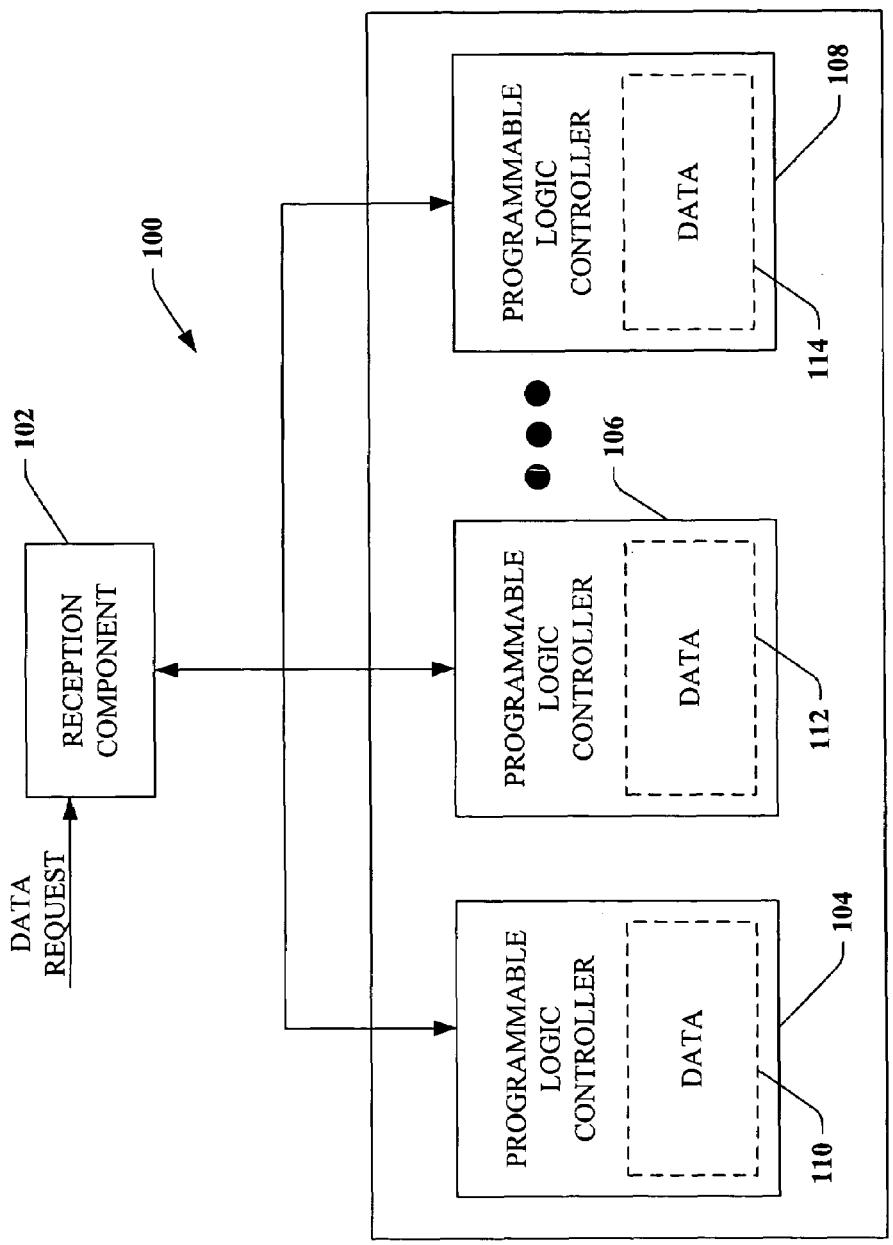
FIG. 1 is a high-level system block diagram of a distributed database system that can be employed within an industrial automation environment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Turning now to the drawings, FIG. 1 illustrates a distributed database system 100 that can be utilized in an industrial automation environment to store and organize data. The distributed database system 100 includes a reception component 102 that receives a request for data, wherein such request for data can be initiated by an operator and/or a programmable logic controller. The reception component 102 is communicatively coupled to a plurality of programmable logic controllers 104-108, where each of the programmable logic controllers 104-108 can include data 110-114 relating to a process and/or device controlled by the programmable logic controllers 104-108. For instance, the data 110 can relate to a device and/or process controlled by the programmable logic controller 104. It is understood, however, that any arrangement of data between the programmable logic controllers 104-108 is contemplated and intended to fall under scope of the hereto-appended claims. It is further illustrated that, as far as review and retrieval of data is concerned, the programmable logic controllers 104-108 can be viewed as a single unit 116. Thus, the programmable logic controllers 104-108 can be collectively queried during a single instance in time without having to create a separate database that stores the data 110-114.

The data 110-114 within the programmable logic controllers 104-108 can conform to a hierarchically structured data model, and the data can be received, executed, and/or created by the programmable logic controllers 104-108. Thus, the data 110-114 can be in the form of objects that conform to the hierarchically structured data model. The hierarchically structured data model can be based at least in part upon ISA S88, ISA S95, OMAC, and/or any suitable combination thereof. Accordingly, the data 110-114 can be representative of particular devices, portions of device, processes, portions of processes, and the like. For instance, database instances can be represented within the programmable logic controllers 104-108 or as associated data collection modules on a chassis of at least one of the controllers 104-108. The programmable logic controllers 104-108 can include a least a portion of a schema that enables such controllers 104-108 to recognize and output data that is structured in accordance with the hierarchically structured data model. The programmable logic controllers 104-108, through utilization of this data model, can interact with other controllers as well as higher-level systems, such as an Enterprise Resource Planning (ERP) system. ERP systems typically handle manufacturing, logistics, distribution, inventory, shipping, invoicing, and accounting for a company. The schema referenced above can also be employed by an ERP system associated with the programmable logic controller, thereby enabling seamless communication between programmable logic controllers and ERP systems. In one particular example, devices acting as a distributed database can aggregate and replicate data vertically through a specified hierarchy of databases or horizontally between databases at a similar level of a hierarchy. The data therein can then be exchanged for business analytics, data integrity or management purposes. Conventional systems, in contrast, often require ad-hoc programming to map between low-level logic utilized in controllers with more advanced object-oriented programming languages often employed within ERP systems. Another common use would be to interact with a Supply Chain Management system (SCM).

The hierarchically structured data model can be designed in such a manner to enable the data 110-114 to correspond to a hierarchical arrangement of devices and/or a hierarchical arrangement of processes that occur within the plant. Furthermore, the hierarchically structured data model can be designed in a manner that enables modeling of a plant across system and/or process boundaries. For instance, today's manufacturing facilities include batch processing, continuous processing, discrete processing, as well as inventory processing. Communication of meaningful data between these systems and processes is extremely difficult, as they are often designed and operated without regard for an adjacent process. The hierarchically structured data model can be implemented so that a substantially similar structure is provided with respect to a batch process, a continuous process, a discrete process, and inventory tracking. In still another example, data can be exchanged vertically or horizontally between databases. Such exchanges can be scheduled or event-based, and may be in terms of scheduled store and forward of all or part of data (or related to internal or external events that trigger upload of aggregated or native data). Furthermore, data exchanges can involve one or more sources and destinations, and may involve multiple transport protocols: CIP to http in the case of external web services and can further involve negation of configured firewalls.

An example is provided herein to illustrate one or more applications of the system 100. The programmable logic controller 106 can be utilized to control a process that is associated with a process being controlled by the programmable logic controller 104. In more detail, the programmable logic controller 104 can be utilized to control mixing of a batch, and the programmable logic controller 106 can be employed to package results of the batch. Accordingly, the programmable logic controller 106 may utilize data 110 from within the programmable logic controller 104, such as data that indicates when mixing is complete, data indicating a volume of the batch, or any other suitable data. The programmable logic controller 106 can issue a request for the data to the reception component 102, which can then be utilized in connection with locating the requested data. Such data can then be delivered to the programmable logic controller 106 either directly from the programmable logic controller 104 or by way of the reception component 102. In another example, an operator may wish to review status of a particular process, but may not have knowledge of exactly where the data associated with the process was created or currently resides. The operator can submit a data request to the reception component 102, which can in turn locate requested data from within an appropriate programmable logic controller.

Figure 2:
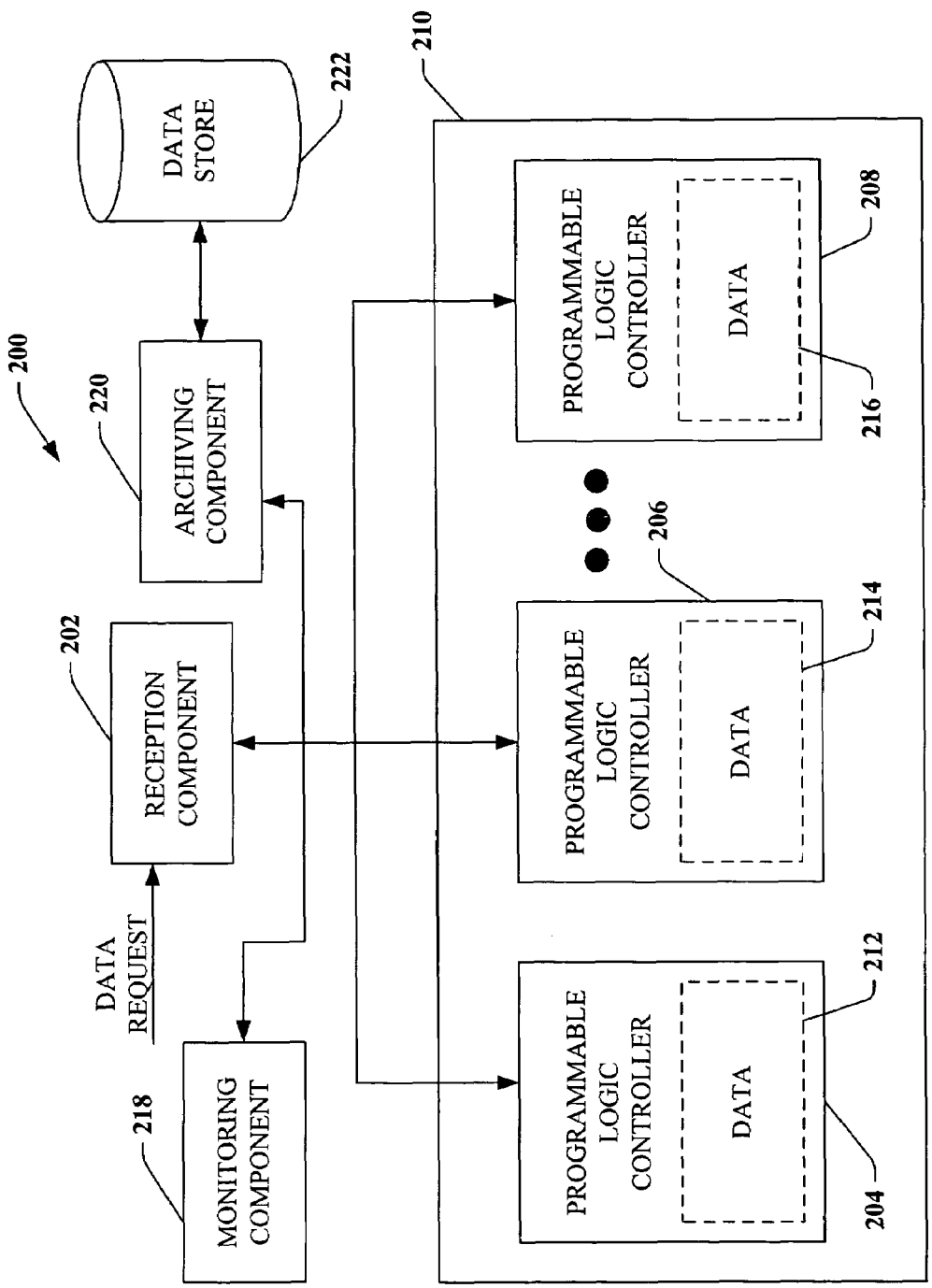
FIG. 2 illustrates a system that facilitates archiving of data within a distributed database system.

Referring now to FIG. 2, a distributed database system 200 within an industrial automation environment is illustrated. The system 200 includes a reception component 202 that receives a request for data that is associated with a plurality of programmable logic controllers 204-208. To one requesting data, the programmable logic controllers 204-208 can appear as a single entity 210 (much as one searching a hard disk on a computer). The programmable logic controllers 204-208 include data 212-216 that has either been received, executed, and/or created by the programmable logic controllers 204-208. As described above, the data 212-216 can conform to a hierarchically structured data model, thereby enabling the programmable logic controllers 204-208 to be more knowledgeable regarding processes/systems controlled by such controllers 204-208. For instance, the hierarchically structured data model can be based at least in part upon ISA S95, ISA S88, and/or OMAC. The reception component 202 can locate the requested data from within the programmable logic controllers 204-208 and facilitate provision of the requested data to a requesting entity.

The distributed database system 200 can further include a monitoring component 218 that monitors available storage capacity with respect to each of the programmable logic controllers 204-208. The monitoring component 218 can interrogate each of the programmable logic controllers 204-208 to determine available storage capacity and/or can receive messages from the programmable logic controllers 204-208 regarding available storage capacity. The monitoring component 218 can then cause data to be relocated amongst the programmable logic controllers 204-208 based at least in part upon the monitored storage capacity of each of the programmable logic controllers 204-208. For instance, if the programmable logic controller 204 has utilized ninety percent of storage capacity associated therewith while the programmable logic controller 206 has utilized fifty percent of storage capacity associated therewith, the monitoring component 218 can cause at least a portion of the data 212 to be transferred from the programmable logic controller 204 to the programmable logic controller 206. Thus, when storage capacity associated with one of the programmable logic controllers 204-208 falls below a threshold, data can be transferred to a disparate programmable logic controller (based at least in part upon available storage associated with the disparate programmable logic controller). The monitoring component 218 can utilize other criteria in connection with determining when/where to transfer data, such as physical proximity between programmable logic controllers 204-208, relationship between devices/processes controlled by the programmable logic controllers 204-208, etc.

The distributed database system 200 can further include an archiving component 220 that automatically archives at least portions of data within the programmable logic controllers 204-208. For instance, the data 212-216 can include objects that are associated with time stamps. Often, recent data is most valuable to an operator, as the operator may wish to know current status of a process. Past data, however, can also be valuable for auditing or other suitable purposes. Accordingly, it may be desirable to retain data, even after such data has been in existence for an extended period of time. The archiving component 220 can cause data that has been existent for over a threshold period of time to be removed from the programmable logic controllers 204-208 and placed in a data store 222 external to the controllers 204-208. This data store 222 can be subsequently searched by a requesting entity by way of the reception component 202. The archiving component 220 can monitor the data 212-216 within the programmable logic controllers 204-208 in connection with relocating such data to the data store 222 and/or receive notifications from the programmable logic controllers 204-208 regarding data therein that has been unmodified for a particular period of time.

Figure 3:
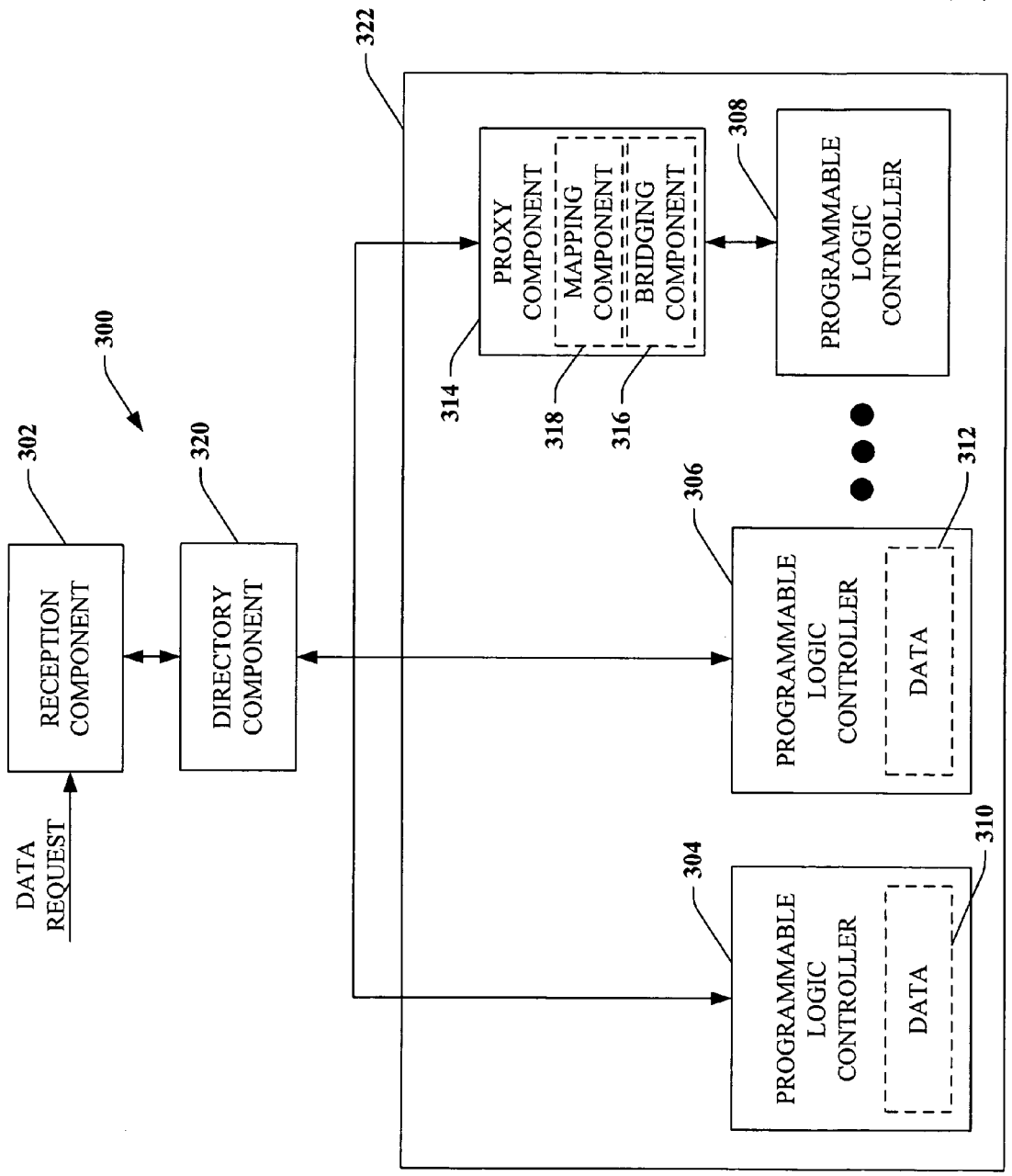
FIG. 3 illustrates a system that facilitates mapping of data associated with a flat structure to data that conforms to a hierarchically structured data model within a distributed database.

Now turning to FIG. 3, a distributed database system 300 is illustrated. The system 300 includes a reception component 302 that receives a request for data that is associated with one or more of a plurality of programmable logic controllers 304-308. The programmable logic controllers 304 and 306 can receive, execute, and generate data 310-312 that conforms to a hierarchically structured data model. The programmable logic controller 308 can be a legacy device that creates data that is indicative of status of tags and outputs such data to a network. Thus, the programmable logic controller 308 may not include suitable data storage for retaining a significant amount of data. Data output by the programmable logic controller 308 can be provided to a proxy component 314 that facilitates mapping the data from the programmable logic controller 308 to data that conforms to the hierarchically structured data model.

In more detail, the proxy component 314 can include a bridging component 316 that operates as a bridge between disparate networks. For example, the programmable logic controller 308 may be adapted to send/receive data over a first network protocol, such as ProfiBus, FieldBus, Foundation FieldBus, Hart, or the like, while a database system may be associated with a search component that is designed to search data over a second network protocol, such as the Common Industrial Protocol (CIP). The bridging component 316 can recognize that data from the programmable logic controller 308 is packaged in accordance with the first network protocol and thereafter re-package such data so that it conforms to the second network protocol.

The bridging component 316 can be associated with a mapping component 318 that can reformat the data so that it is in accordance with the hierarchically structured data model. For instance, the mapping component 318 can access templates associated with a data model employed by the programmable logic controller 308 and utilize such templates to map the data to the hierarchically structured data model. While not shown, it is understood that data associated with the programmable logic controller 308 can be stored in disparate programmable logic controllers and/or within another data storage unit. In more detail, persistent data encoding formats can vary between database instances—however, models represented can be represented in a context of a common model utilizing a known schema, thereby facilitating data conversion between different schema and data formats. For instance, part counters in a factory should be associated with a similar schema format but, however, may be quite different (e.g., one can be an integer counter and one can be a float counter). In another example, a part count can be output in XML in a first instance, binary in a second instance, and in a database format in a third instance. These instances can be registered in the hierarchically structured data model, thereby enabling data exchange between the instances (by way of the mapping component 318). The mapping component 318 can account other contextual information, such as traversal of cultural boundaries such as metric to imperial units of measure and language conversion. The conversion can transition between security contexts and involve encryption and decryption, compression and decompression of data.

The distributed database system 300 can further include a directory component 320 that includes references between data objects and locations of such objects associated with the programmable logic controllers 304-308. The directory component 320 is communicatively coupled to the plurality of controllers 304-308, which can be viewed through the directory structure as a single unit 322. The programmable logic controllers 304-306 can include at least a portion of a schema that enables instantiation of data objects that conform to a hierarchically structured data model. For instance, the schema can be utilized to represent a plant hierarchically, including devices, phases, and the like.

The distributed database system 300 can operate in the following manner. A requesting entity, which can be one of the programmable logic controllers 304-308, an operator, or any other suitable entity, can request data known to be existent within the system 300—however, the requesting entity may not have knowledge of location of such data. The requesting entity can provide a request for the data to the reception component 302, which in turn can relay the request to the directory component 320. The directory component 320 can include pointers relating to an exact location of the data within the system 300 (e.g., within the programmable logic controller 306). The reception component 302 can then request the data through the directory component 320, and the data can be retrieved from the appropriate programmable logic controller. Data creation can operate in a substantially similar fashion. For instance, the controller 304 can generate data, and indications of location of the data can be provided to the directory component 320. Thus, if a requesting entity later desired to retrieve such data, the directory component 320 would be aware of the location and deliver the data to the requesting controller.

Figure 4:
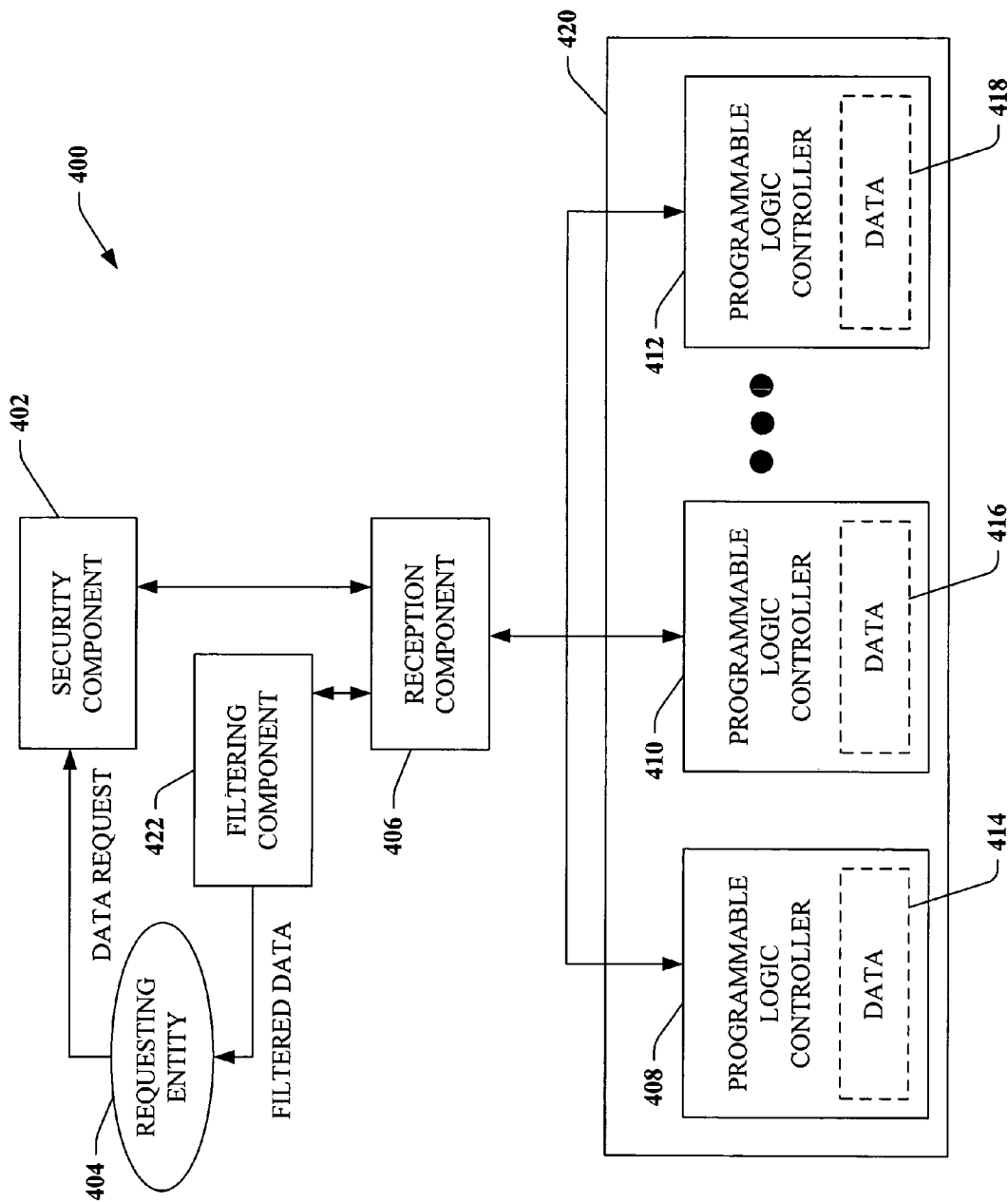
FIG. 4 illustrates a system that facilitates authorizing a user prior to enabling access to a distributed database.

Turning now to FIG. 4, a distributed database system 400 that can be employed within an industrial automation environment is illustrated. The database system 400 includes a security component 402 that receives a data request from a requesting entity 404. The security component 402 is employed to ensure that the requesting entity 404 is authorized to access data associated with the distributed database system 400. For example, it may not be desirable to grant access to accounting data within the distributed database system 400 to a line worker. Similarly, it would not be desirable to grant access to the distributed database system 400 to an individual or entity desiring to corrupt data associated with the system 400. The security component 402 can request identifying data from the requesting entity 404, such as username, password, personal identification number, digitized biometric indicia, or any other suitable data. The security component 402 can then analyze the provided data and determine whether the requesting entity 404 is authorized to access data within the distributed database system 400. For instance, the security component 402 can review a table that includes identities of entities and authorization levels associated therewith.

In still another example, the security component 402 can ensure that the distributed database system 400 is associated with sufficient physical resources to enable addition of data to the system 400 by an entity or device. For instance, the security component 402 can determine that at least a portion of the system 400 is not associated with a power source, and inform an operator of such lack of power. In another example, the security component 402 can determine that at least a portion of the system 400 is associated with insufficient memory or processing capabilities to store/aggregate data. Still further, the security component 402 can consider an entity/user's context, such as entity/user's role (operator, technician, electrician, . . . ), an entity/user's scenario (routine maintenance, plant diagnostics, . . . ), and such context can be input to the security component 402 and employed to manage access to the system 400. Further, the security component 402 can account for configuration of the system 400 as well as connected devices. Still further, the security component 402 can analyze created records and determine whether a manually entered event is physically possible, and whether a user entering an event is authorized to undertake such entry.

If the requesting entity 404 is authorized to access the distributed database system 400, the requesting entity 404 can provide a request for data to a reception component 406, which can facilitate retrieval of the requested data. In more detail, the reception component 406 can locate the requested data from within one or more of a plurality of programmable logic controllers 408-412, each of which includes data 414-418 received, executed, and/or generated by the programmable logic controllers 408-412. The plurality of programmable logic controllers 408-412 can be thought of as a single unit 420 which can be searched over for desirable data. Moreover, while not shown, it is understood that the unit 420 can include other data sources that can be searched over for desired data. Upon locating the requested data, the reception component 406 can provide the data to a filtering component 422, which can filter the requested data based upon user identity, versioning information associated with the requested data, and the like. For instance, the filtering component 422 can prohibit particular individuals/entities from receiving data that they have no association with. Moreover, the filtering component 422 can ensure that a version of an object received by the requesting entity 404 is an appropriate version. In more detail, the requesting entity 404 can be a programmable logic controller configured to utilize a particular version of an object. Therefore, it would be problematic if the requesting entity 404 were provided with an incorrect version of such object.

Figure 5:
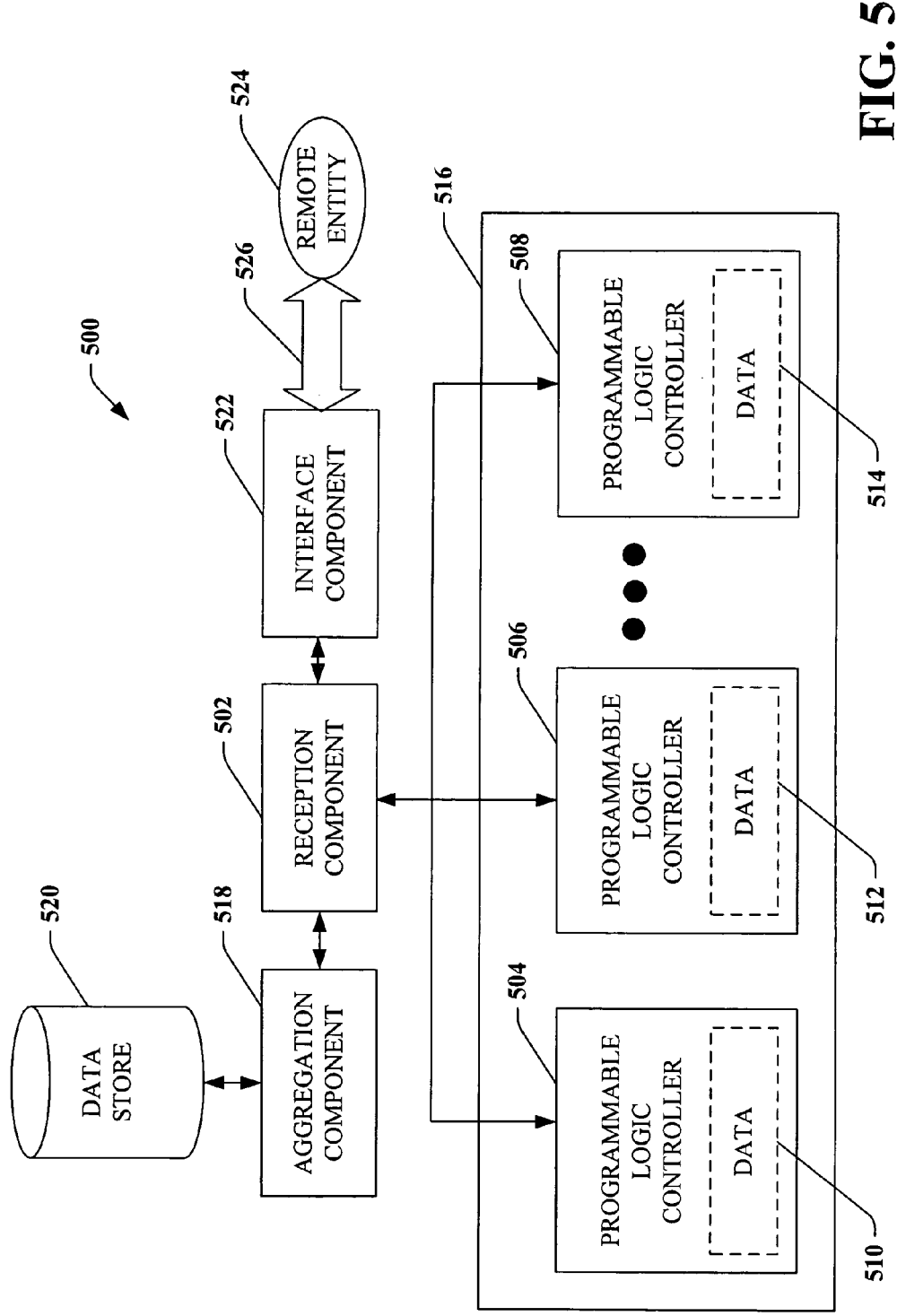
FIG. 5 illustrates a system that facilitates accessing a distributed database over one of an intranet and the Internet.

Referring now to FIG. 5, a distributed database system 500 that can be employed within an industrial automation environment is illustrated. The system 500 includes a reception component 502 that receives a request for data that is resident within at least one of a plurality of programmable logic controllers 504-508. The programmable logic controllers 504-508 can receive, execute, and generate data 510-514 that conforms to a hierarchically structured data model (e.g., which can be modeled after one or more of ISA S95, ISA S88, and OMAC). Upon receipt of the data request, the reception component 502 can facilitate locating the data from amongst the programmable logic controllers 504-508 and returning such data to the requesting entity. Thus, it can be discerned that the plurality of programmable logic controllers 504-508 can be reviewed as a single unit 516 through the reception component 502.

The distributed database system 500 can further include an aggregation component 518 that aggregates related data from within the programmable logic controllers 510-514 and places such data within a data store 520. For instance, the aggregation component 518 can operate much like a cache associated with an Internet search engine, where most frequently requested data and/or most recently requested data is stored within the data store 520 to enable retrieval of data therein to occur more efficiently. The distributed database system 500 can further include an interface component 522 that enables a remote entity 524 to obtain access to the data 510-514 by way of one of an intranet or the Internet 526. For instance, the interface component 522 can include ports, cabling, and other hardware/software that enables transferal of data between the reception component 502 and the remote entity 524. Accordingly, the remote entity 524 can employ the interface component 522 to access the data 510-514 from within the programmable logic controllers 504-508 from a location remote from the programmable logic controllers 504-508.

Figure 6:
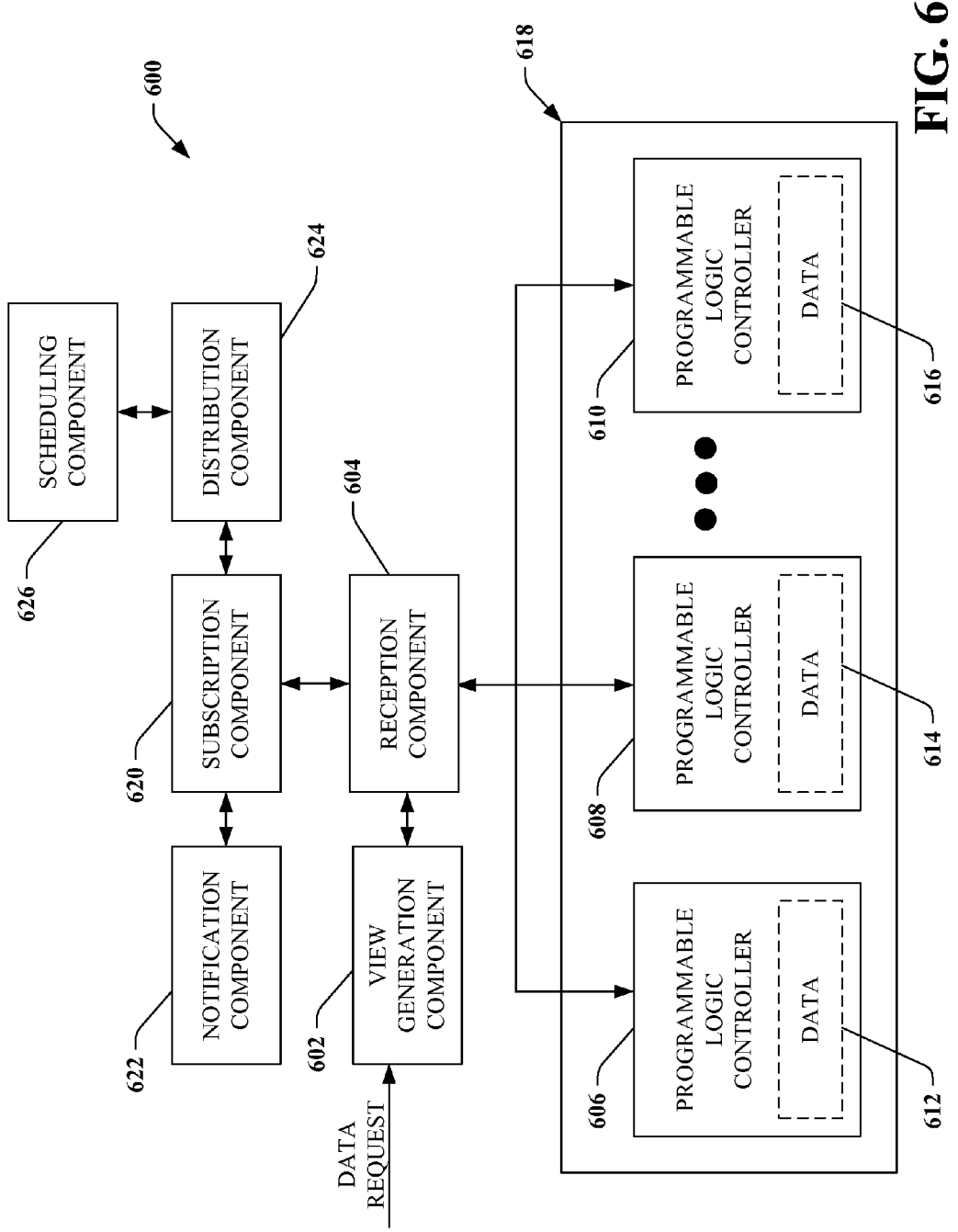
FIG. 6 illustrates a system that facilitates distribution of data within a distributed database to one or more subscribing entities.

Turning now to FIG. 6, a distributed database system 600 that can automatically distribute data to one or more subscribing entities is illustrated. The distributed database system 600 includes a view generation component 602 that is employed to generate views of data available within the distributed database system 600. For instance, data within the distributed database system 600 can conform to a hierarchically structured data model, and the view generation component 602 can in turn create a hierarchical view of data within the system 600 (which maps to the data model). In more detail, data within the distributed database system 600 can include objects representative of disparate portions of a system and/or disparate portions of a process, and these objects can be hierarchically arranged and displayed by the view generation component 602. Thus, if an operator desired access to data associated with a particular device, he could traverse through a hierarchy provided by the view generation component 602 until such device is reached (e.g., enterprise, factory, cell, line, device).

A selection of a portion of the hierarchy presented by the view generation component 602 can be passed to a reception component 604 as a request for such data. The reception component 604 can then be employed to locate the requested data from within one or more of a plurality of programmable logic controllers 606-610, wherein each of the programmable logic controllers can include data 612-616 relating to devices/processes controlled by such controllers 606-610. As described above, the data 612-616 can conform to a hierarchically structured data model, which in turn can be based at least in part upon ISA S95, ISA S88, OMAC, or any suitable combination thereof. The programmable logic controllers 606-610 can operate as a distributed database, and thus can be perceived as a single unit 618 to an individual requesting data. Moreover, while the unit 618 is shown as including only programmable logic controllers, it is understood that other devices that can store data can be placed therein. Data requested by way of the reception component 604 can be retrieved and provided to a requesting entity through the view generation component 602.

The distributed database system 600 can further include a subscription component 620, where users of such system can subscribe to particular data within the system 600. For instance, an operator can inform the subscription component that they would like to be notified of creation of particular data objects associated with a device that is related to the operator's duties. A notification component 622 can be associated with the subscription component 620 and the plurality of programmable logic controllers 606-610, and notify subscribers of creation/existence of data depending upon subscription parameters. For instance, a notification can occur by way of an instant messaging service, email, text message, or any other suitable manner of relaying a notification to an appropriate subscriber. Similarly, the subscription component 620 can be associated with a distribution component 624 that is tasked to automatically distribute data created/existent within the programmable logic controllers 606-610 based upon subscription information. The data can be automatically provided to a station, relayed via email, or any other suitable manner for delivering data. In one example, a subscriber can request that data objects created relating to alarms for a particular set of devices be provided to the subscriber for analysis. The distribution component 624 can be employed to undertake such distribution of the object to the subscriber. Furthermore, a scheduling component 626 can be associated with the distribution component 624, wherein the scheduling component 626 maintains a schedule for distributing data to subscribers. For instance, the scheduling component 626 can ensure that a subscriber is at a work station prior to the distribution component 624 delivering data to the subscriber. In a more detailed example, the scheduling component 626 can determine if the user is logged onto a work station, monitor a key card to determine if the operator is within a plant, etc.

Figure 7:
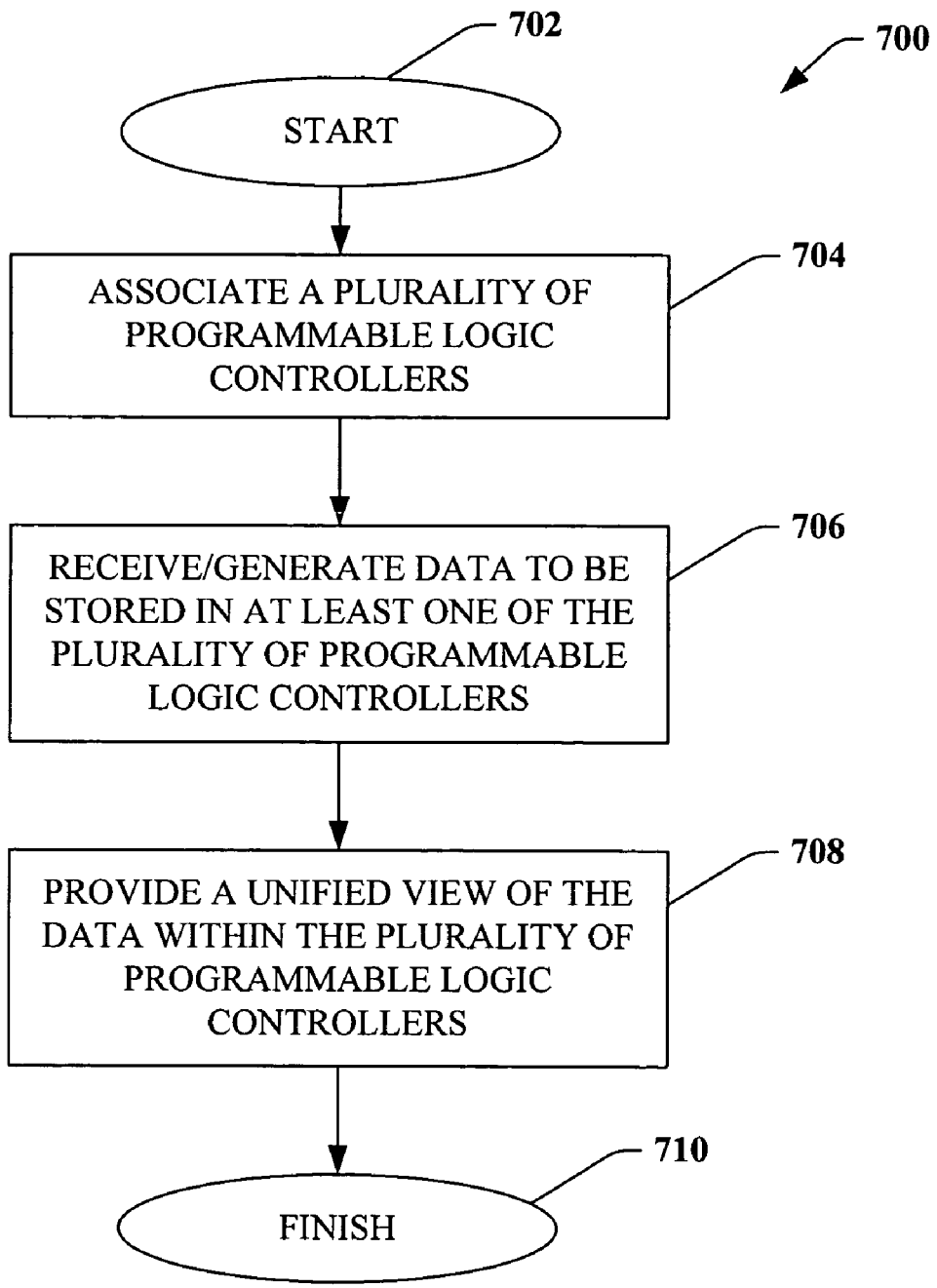
FIG. 7 illustrates a representative flow diagram of a methodology for providing a unified view of data within an industrial automation environment.
Figure 8:
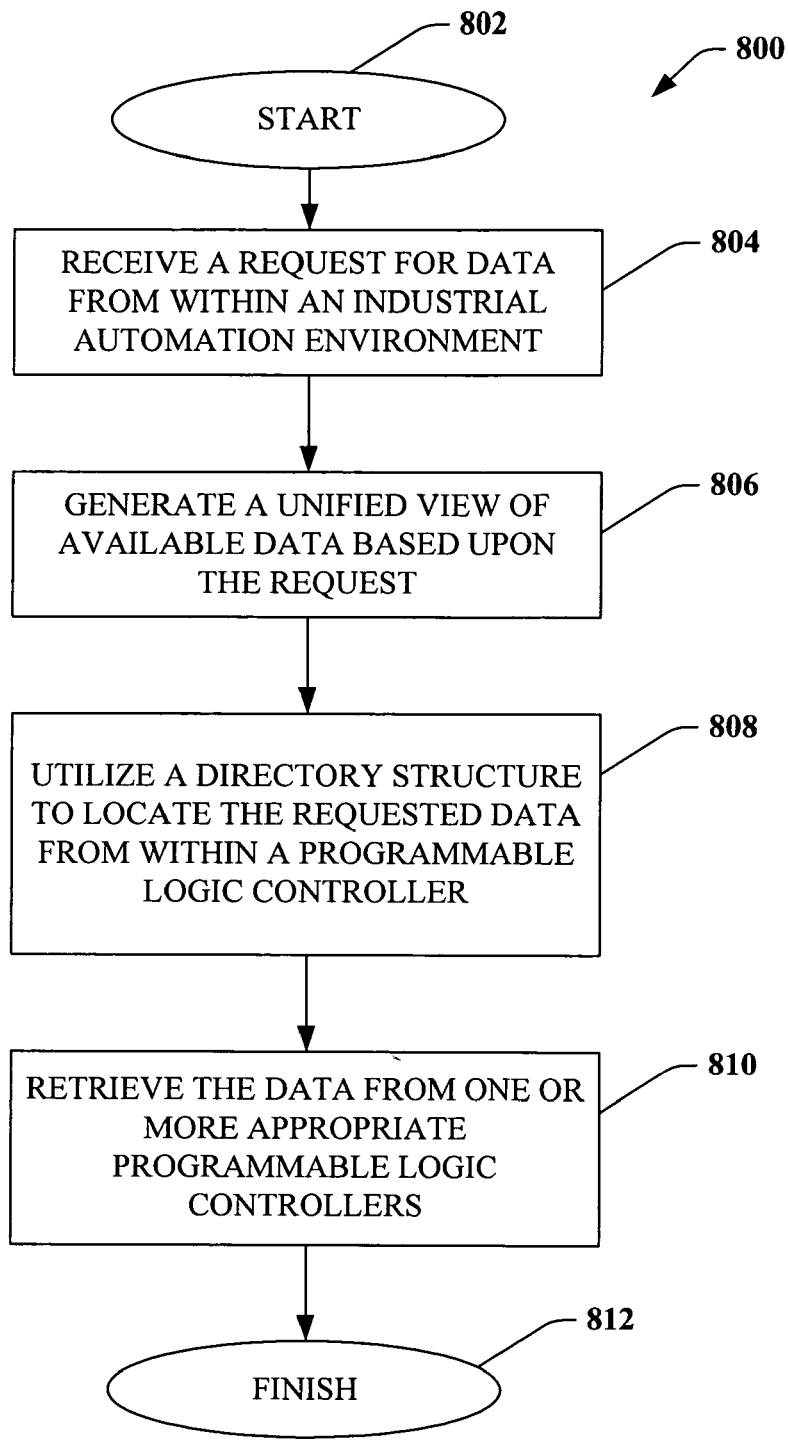
FIG. 8 is a representative flow diagram of a methodology for retrieving data from a distributed database.
Figure 9:
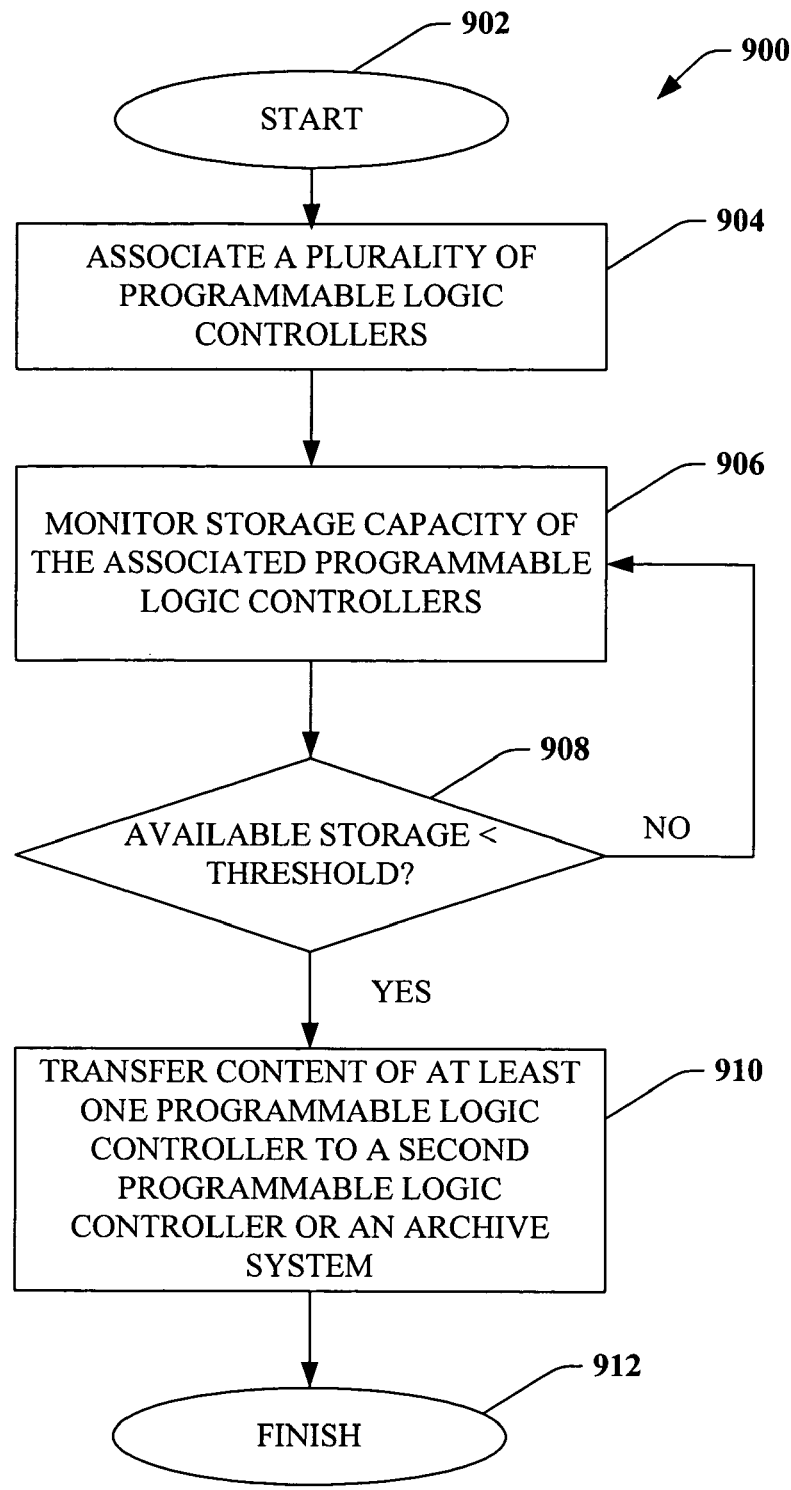
FIG. 9 is a representative flow diagram of a methodology for automatically transferring data between storage devices within an industrial automation environment.

Referring to FIGS. 7-9, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning specifically to FIG. 7, a methodology 700 for providing a distributed database system within an industrial automation environment is illustrated. The methodology 700 begins at 702, and at 704 a plurality of programmable logic controllers are associated. For instance, the plurality of programmable logic controllers can be communicatively associated with one another through one or more networks. Furthermore, other devices capable of storing data associated with an industrial system and/or process can be associated with the plurality of programmable logic controllers. At 706, data is received and/or generated and thereafter stored in at least one of the plurality of programmable logic controllers. In more detail, the data can conform to a hierarchically structured data model and can be received, executed, and/or created by the programmable logic controllers. At 708, a unified view of the data within the plurality of programmable logic controllers can be provided. For example, rather than an operator having to know an exact location of data and/or be physically proximate to a programmable logic controller or associated storage device, a unified view of data can be provided to the operator, wherein such view can be hierarchical in nature. Thus, the operator can traverse the hierarchy and obtain desired data. The methodology 700 completes at 710.

Referring now to FIG. 8, a methodology 800 for retrieving data from one or more programmable logic controllers is illustrated. The methodology 800 starts at 802, and at 804 a request for data within an industrial automation environment is received. At 806, a unified view of data available to a requesting entity is provided. Thus, even though the data can be existent in a plurality of sources, a requesting entity will be provided with a perception that such data is available from a single source. Furthermore, the data requested can conform to a hierarchically structured data model, which is in contrast to the flat-file structure associated with conventional programmable logic controllers. At 808, a directory structure is utilized to locate the requested data from within one or more programmable logic controllers. For instance, programmable logic controllers can provide pointers to data therein to a directory structure. This directory structure can then be utilized in connection with creation of views as well as location of data. At 810, data is retrieved from at least one programmable logic controller based upon the pointers within the directory structure, and the methodology 800 completes at 812.

Now referring to FIG. 9, a methodology 900 for transferring data between storage devices within a distributed database system is illustrated. The distributed database system is existent within an industrial automation environment. The methodology 900 begins at 902, and at 904 a plurality of programmable logic controllers are associated with one another. At 906, storage capacity of the associated programmable logic controllers is monitored, wherein the monitoring can be undertaken with respect to individual programmable logic controllers or a collection of programmable logic controllers. The monitoring can be effectuated by actively interrogating programmable logic controllers to determine available storage capacity, receiving updates from programmable logic controllers regarding available capacity, or any other suitable manner for monitoring storage capacity. At 908, a determination is made regarding whether available storage capacity is below a pre-defined threshold. For instance, a programmable logic controller can be monitored to determine if a particular amount of storage space is available. Similarly, the programmable logic controller can be analyzed to determine a percentage of total space that is available space.

If the available storage capacity is not less than the threshold (e.g., the programmable logic controllers are associated with sufficient available storage), then the methodology 900 can return to act 906. If available storage associated with one or more programmable logic controllers has fallen below the available threshold, then at 910 content of at least one programmable logic controller is transferred to a second programmable logic controller or to an archive system. For instance, a first controller can have a small amount of available storage while a second controller can have a significant amount of available storage. Thus, data can be automatically transferred from the first controller to the second controller. Similarly, if transferring data between controllers is not desirable, when a controller is associated with a lack of available storage, data can be transferred to a data storage device that is utilized for archiving data. The methodology 900 completes at 912.

Figure 10:
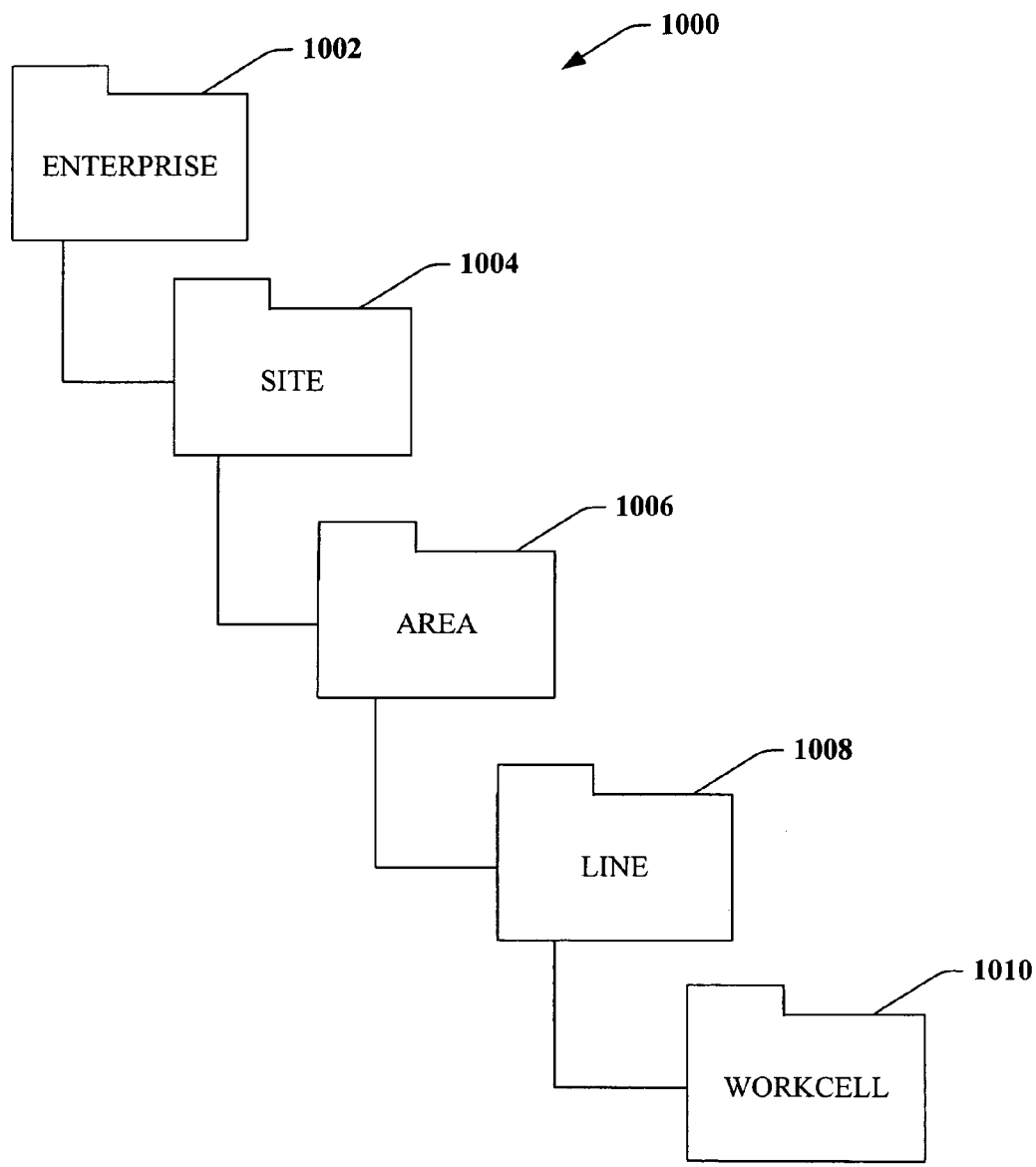
FIG. 10 is a visual representation of an exemplary structure upon which the hierarchically structured data model can be based.

Referring now to FIG. 10, an exemplary hierarchical structure 1000 which can be utilized in connection with the hierarchically structured data model described herein is illustrated. For example, the data model can facilitate nested structures, thereby mitigating deficiencies associated with data models that employ flat namespaces. The structure 1000 includes an enterprise level 1002, where a particular enterprise can be represented within data structured in accordance with a hierarchical data model. Beneath the enterprise level 1002 level can be a site level 1004, so that a particular factory (site) within an enterprise can be represented within a data packet. Beneath the site level 1004 an area level 1006 can exist, which specifies an area within the factory that relates to the data. A line level 1008 can lie beneath the area level 1006, wherein the line level 1008 is indicative of a line associated with particular data. Beneath the line level 1008 a workcell level 1010 can exist, thereby indicating a workcell associated with the data. Utilizing a nested, hierarchical data model, PLCs can become more aware of data associated therewith. Furthermore, the hierarchy 1000 can be customized by an owner of such hierarchy. For instance, more granular objects/ levels can be defined within the hierarchy 1000.

Figure 11:
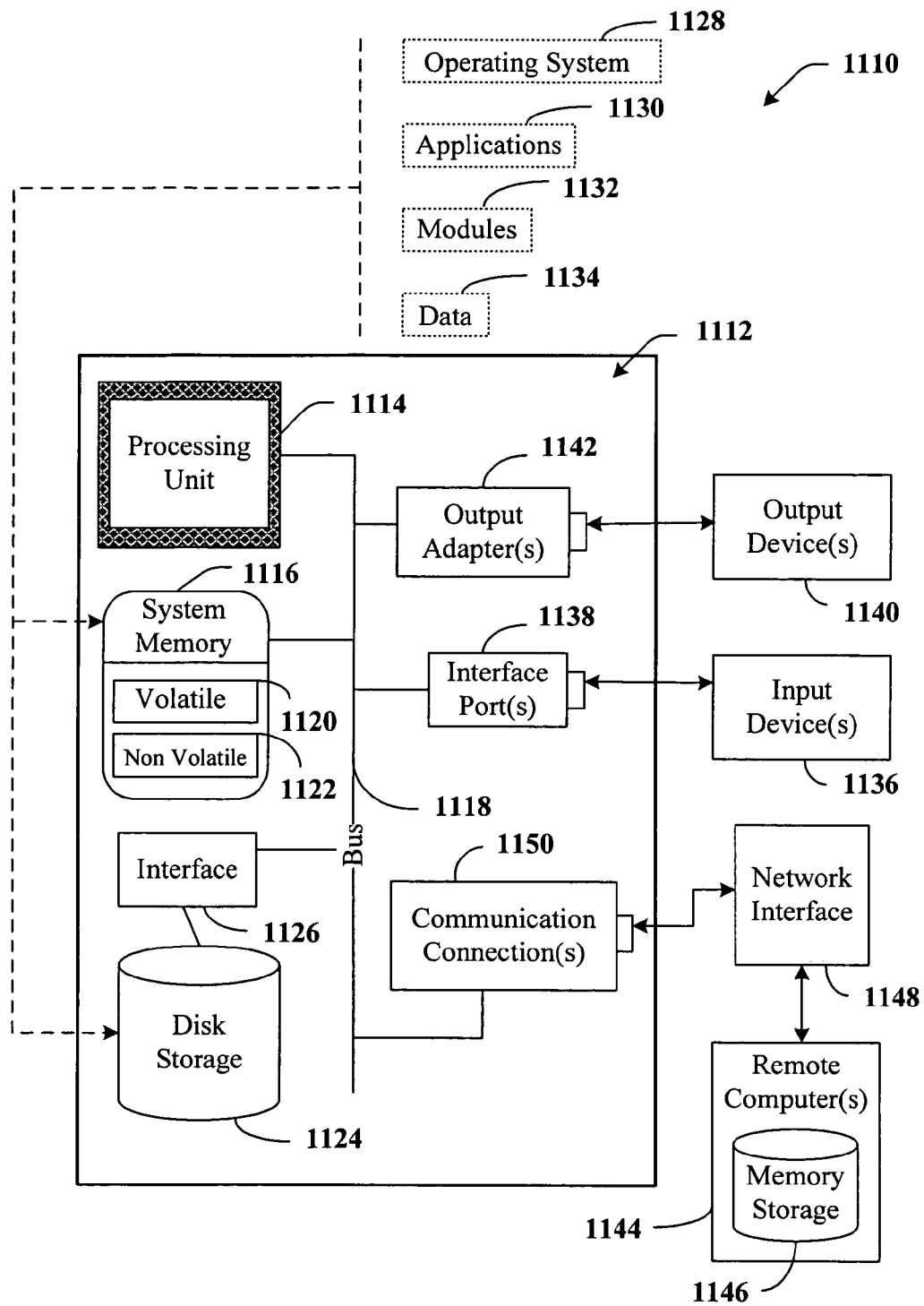
FIG. 11 is an example operating system upon which various features described herein can be implemented.

With reference to FIG. 11, an exemplary environment 1110 for implementing various aspects of the invention includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the subject invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

Figure 12:
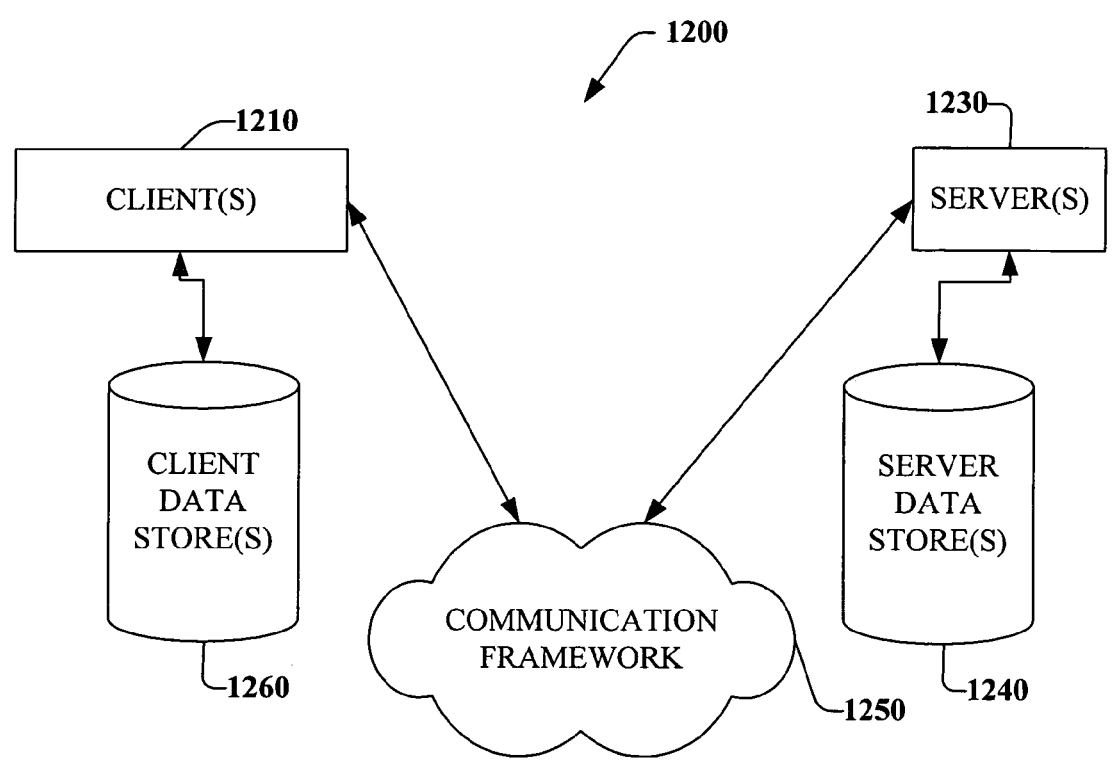
FIG. 12 is an exemplary computing environment within which various features described herein can interact.

FIG. 12 is a schematic block diagram of a sample-computing environment 1200 with which the subject invention can interact. The system 1200 includes one or more client(s) 1210. The client(s) 1210 can be hardware and/or software (e.g., threads, processes, computing devices). The system 1200 also includes one or more server(s) 1230. The server(s) 1230 can also be hardware and/or software (e.g., threads, processes, computing devices). The servers 1230 can house threads to perform transformations by employing the subject invention, for example. One possible communication between a client 1210 and a server 1230 can be in the form of a data packet adapted to be transmitted between two or more computer processes. The system 1200 includes a communication framework 1250 that can be employed to facilitate communications between the client(s) 1210 and the server(s) 1230. The client(s) 1210 are operably connected to one or more client data store(s) 1260 that can be employed to store information local to the client(s) 1210. Similarly, the server(s) 1230 are operably connected to one or more server data store(s) 1240 that can be employed to store information local to the servers 1230.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A distributed database system within an industrial automation environment, comprising:
   a processor;
   a memory communicatively coupled to the processor, the memory having stored thereon computer-executable instructions configured to implement the system, including:
   a hierarchically structured data model representation of a plurality of controllers within an industrial automation system, the hierarchically structured data model representing data stored within the plurality of controllers as data objects located within a nested plant hierarchy;
   a reception component that receives and services a request for data that is located within at least one of the plurality of controllers, the reception component employs the hierarchically structured data model to collectively query the plurality of controllers as a single unit and to retrieve the requested data from the at least one of the plurality of controllers; and
   a directory structure that receives a pointer from one of the plurality of controllers indicating a location of a data object within the plant hierarchy, the directory structure maintaining the pointer to facilitate location and retrieval of the data object by the reception component.

2. The database system of claim 1, further comprising an archiving component that automatically archives data from within at least one of the controllers a pre-defined amount of time after creation of the data.

3. The database system of claim 1, further comprising a monitoring component that facilitates transfer of data from a first controller to a second controller upon available data storage in the first controller reaching a pre-defined threshold.

4. The database system of claim 1, further comprising a proxy component that facilitates utilizing at least one of a legacy or a third party controller within the database system.

5. The database system of claim 4, the proxy component comprises a mapping component that maps data from the one of the legacy or the third party controller from a first data format to a second data format that conforms to the hierarchically structured data model.

6. The database system of claim 4, the proxy component comprises a bridging component that packages data adapted for transmission over a first network for transmission over a second network.

7. The database system of claim 6, the second network is CIP.

8. The database system of claim 1, further comprising a security component that ensures that an entity requesting the data is authorized to received the data.

9. The database system of claim 1, further comprising a filtering component that filters data from the plurality of controllers based at least in part upon one or more of identity of an entity requesting the data or versioning information associated with the requested data.

10. The database system of claim 1, the hierarchically structured data model is based at least in part upon one or more of ISA S95, ISA S88, OMAC or a combination thereof.

11. The database system of claim 1, further comprising an interface component that facilitates access to the data within the plurality of controllers from a remote location.

12. The database system of claim 11, the interface component facilitates accessing the data by way of the Internet.

13. The database system of claim 1, further comprising an aggregation component that aggregates related data from within the plurality of controllers and stores the aggregated data in a same location.

14. The database system of claim 1, further comprising a subscription component that enables an operator to subscribe to receive a specific data object within the database system.

15. The database system of claim 14, further comprising a distribution component that automatically distributes the specified data object to the subscribing operator upon creation of the specified objects within the database system, the distribution based at least in part upon parameters associated with the subscription.

16. The database system of claim 14, further comprising a notification component that automatically notifies the subscribing operator regarding creation of the specific data object, the notification based at least in part upon parameters associated with the subscription.

17. The database system of claim 16, further comprising a scheduling component that ensures that the subscribing operator is at a specified location prior to notifying the subscribing operator.

18. The database system of claim 1, further comprising an interface component that generates a unified hierarchical view of the data within the plurality of controllers, the hierarchical view including at least a factory level, a cell level, a line level, and a device level, wherein the interface component facilitates traversal of the hierarchical view to locate and obtain data within the plant hierarchy.

19. A computer implemented method for utilizing a plurality of controllers as a distributed database comprising:
representing an automation environment that includes the plurality of controllers as a hierarchically structured data model having at least a site level, an area level, a line level, and a workcell level;
communicatively associating the plurality of controllers;
representing data stored within the plurality of controllers as data objects within the hierarchically structured data model;
providing a unified hierarchical view of the data objects within the plurality of controllers, the data conforms to the hierarchically structured data model;
receiving a pointer from at least one of the plurality of controllers indicating a location of a data object within the automation environment; and
maintaining the pointer to facilitate location and retrieval of the data object from the automation environment.

20. The method of claim 19, further comprising:
receiving a request for a subset of the data stored within the plurality of controllers;
collectively querying the plurality of controllers as a single entity for the requested data; and
retrieving the requested data from at least one of the plurality of controllers.

21. The method of claim 20, further comprising authenticating an initiator of the request prior to querying the plurality of controllers.

22. The method of claim 20, further comprising filtering the retrieved data based at least in part upon user identity.

23. The method of claim 20, further comprising mapping data stored in at least one of the plurality of controllers so that the data conforms to the hierarchically structured data model.

24. The method of claim 20, further comprising converting data formatted in accordance with a first network protocol to data formatted in accordance with a second network protocol.

25. The method of claim 24, the second network protocol is Common Industrial Protocol (CIP).

26. A distributed database system for utilization in an industrial automation environment, the system is recorded on a computer-readable medium and capable of execution by a computer, comprising:
means for providing direct access to content stored on a plurality of controllers, the content including data that conforms to a hierarchically structured data model representation of the industrial automation environment;
means for receiving a pointer from at least one of the plurality of controllers indicating a location of a subset of the content;
means for maintaining the pointer to facilitate location and retrieval of the subset of the content from the industrial automation environment;
means for receiving a request for the subset of the content; and
means for employing the hierarchically structured data model and the pointer to collectively search the content of the plurality of controllers for the requested subset as a single entity.

27. The distributed database system of claim 26, further comprising means for transferring data between controllers based at least in part upon available storage capacity associated therewith.

28. The distributed database system of claim 26, further comprising means for archiving data relating to at least one of the plurality of controllers to an external data store.

29. The distributed database system of claim 26, further comprising means for mapping data that does not conform to the hierarchically structured data model to data that conforms to the hierarchically structured data model.

* * * * *